United States Patent
Xia et al.

(10) Patent No.: US 7,060,327 B2
(45) Date of Patent: Jun. 13, 2006

(54) CORROSION PROTECTIVE METHACRYLATE ADHESIVES FOR GALVANIZED STEEL AND OTHER METALS

(75) Inventors: Bo Xia, Lynnfield, MA (US); James Murray, Newmarketr, NH (US); Doug Frost, Newmarket, NH (US); Charles Schuft, Boxborough, MA (US)

(73) Assignee: Henkel Corporation, Rocky Hill, CT (US)

( * ) Notice: Subject to any disclaimer, the term of this patent is extended or adjusted under 35 U.S.C. 154(b) by 0 days.

(21) Appl. No.: 10/982,800

(22) Filed: Nov. 8, 2004

(65) Prior Publication Data

US 2006/0011293 A1 Jan. 19, 2006

Related U.S. Application Data

(60) Provisional application No. 60/519,596, filed on Nov. 13, 2003.

(51) Int. Cl.
*B05D 7/16* (2006.01)
(52) U.S. Cl. .................................. 427/388.1
(58) Field of Classification Search .............. 427/388.1
See application file for complete search history.

(56) References Cited

U.S. PATENT DOCUMENTS

| | | | |
|---|---|---|---|
| 3,041,322 A | 6/1962 | Krieble | 526/320 |
| 3,046,262 A | 7/1962 | Krieble | 540/141 |
| 3,203,941 A | 8/1965 | Krieble | 156/331.1 |
| 3,218,305 A | 11/1965 | Krieble | 526/320 |
| 3,425,988 A | 2/1969 | Gorman | 60/539 |
| 3,591,438 A | 7/1971 | Krieble | 126/310 |
| 4,044,044 A * | 8/1977 | Saito | 526/278 |
| 4,180,640 A * | 12/1979 | Melody et al. | 526/323.1 |
| 4,223,115 A * | 9/1980 | Zalucha et al. | 525/455 |
| 4,309,526 A | 1/1982 | Baccei | 528/75 |
| 4,322,509 A | 3/1982 | Zalucha | 525/287 |
| 4,433,124 A * | 2/1984 | Okamoto et al. | 526/277 |
| 4,554,301 A * | 11/1985 | Dohi et al. | 524/210 |
| 4,647,638 A * | 3/1987 | Yokoshima et al. | 526/277 |
| 4,703,089 A * | 10/1987 | Damico | 525/245 |
| 5,004,646 A * | 4/1991 | Benham et al. | 428/344 |
| 5,069,929 A * | 12/1991 | Arai et al. | 427/519 |
| 5,318,998 A * | 6/1994 | Taguchi et al. | 522/24 |

FOREIGN PATENT DOCUMENTS

| | | | |
|---|---|---|---|
| JP | 59-084964 | * | 5/1984 |
| JP | 61-076578 | * | 4/1986 |
| JP | 63-048359 | * | 3/1988 |
| JP | 05-320569 | * | 12/1993 |
| JP | 2003-165806 | * | 6/2003 |
| WO | WO 00/29456 | * | 5/2000 |

* cited by examiner

*Primary Examiner*—Erma Cameron
(74) *Attorney, Agent, or Firm*—Steven C. Bauman

(57) ABSTRACT

Compositions for bonding galvanized surfaces are disclosed. The compositions include either (i) a first part that includes at least one (meth)acrylate component in combination with a free radical inhibitor component and a phosphate ester component and a second part that includes at least one accelerator component or (ii) a first part that includes at least one (meth)acrylate component in combination with an accelerator and a phosphate ester component and a second part that includes a carrier component and a free radical initiator component. Methods for preparing and methods for using these compositions also are disclosed, as are processes for inhibiting corrosion on galvanized surfaces.

3 Claims, No Drawings

CORROSION PROTECTIVE METHACRYLATE ADHESIVES FOR GALVANIZED STEEL AND OTHER METALS

This application claims the benefit of U.S. Provisional Application No. 60/519,596 filed Nov. 13, 2003.

FIELD OF THE INVENTION

The present invention relates generally to compositions for bonding galvanized surfaces and articles of manufacture that contain such compositions. The present invention also relates to methods for preparing the aforementioned compositions and methods of using such compositions. Moreover, the present invention relates to processes for inhibiting corrosion on a galvanized surface.

BACKGROUND OF RELATED TECHNOLOGY

Metal surfaces that are coated with zinc-containing compositions or zinc alloy-containing compositions (e.g., GALFAN® and GALVALUME® alloy-coated steel sheets and strips) often exhibit better corrosion resistance than surfaces that are not coated with such compositions. Accordingly, galvanized (i.e., zinc-coated or zinc alloy-coated) surfaces are routinely utilized in a variety of industries, including the construction, vehicle, and appliance industries.

Even galvanized surfaces, however, are susceptible to corrosion over prolonged periods of time. Such corrosion, of course, comprises the integrity of products assembled with those products (particularly at bond lines), often rendering such products poorly suited or unsuitable for commercial use.

Moreover, it is well-known that it is difficult to bond galvanized surfaces together by means of conventional adhesives. Indeed, conventional adhesive compositions demonstrate poor adhesion to galvanized surfaces at room temperature. More significantly, when exposed to conditions of heat and humidity, conventional adhesive compositions exhibit minimal, if any, tensile strength.

Consequently, galvanized surfaces have traditionally been joined together by welding or mechanical fixing means (e.g., screws, rivets, and lock-forming means). Joining surfaces by welding or mechanical fixing means, however, is labor-intensive and expensive, and does not provide the advantages attendant use of adhesive compositions (e.g., weight-saving advantages, ease of preparation, and cost-effectiveness).

Thus, it would be desirable to provide compositions that (i) demonstrate improved bond strength on galvanized surfaces under various conditions, particularly under conditions of heat and humidity, and (ii) minimize and/or prevent corrosion on galvanized surfaces.

SUMMARY OF THE INVENTION

In one aspect of the invention, there is provided a curable composition for bonding galvanized surfaces including: (a) a first part including: (i) at least one curable (meth)acrylate component; (ii) a free-radical initiator component; and (iii) a phosphate ester component in an amount sufficient to achieve a tensile strength on a galvanized surface of at least about 1000 psi when measured after humidity aging at 85% relative humidity and 85° C. for 250 hours; and (b) a second part including an accelerator component, wherein at least the first part or the second part also includes a corrosion inhibitor.

In another aspect of the invention, there is provided a method for preparing a composition for bonding galvanized surfaces including: (a) forming a first part by admixing at least one curable (meth)acrylate component, at least one free-radical initiator component, and a phosphate ester component, wherein the phosphate ester component is present in an amount sufficient to achieve a tensile strength on a galvanized surface of at least about 1000 psi when measured after humidity aging at 85% relative humidity and 85° C. for 250 hours; (b) forming a second part including at least one accelerator component; and (c) combining parts (a) and (b) under conditions sufficient to effectuate cure, wherein a corrosion inhibitor is admixed with at least the first part or the second part.

In another aspect of the invention, there is provided a method for using a curable composition to bond together two substrates, including the steps of: (a) applying the composition to a first substrate surface; (b) mating the surface of a second substrate in abutting relationship with composition-applied first substrate surface to form an assembly; and (c) maintaining the abutting relationship for a time sufficient to allow the composition to cure, wherein at least one of the abutting substrate surfaces is galvanized and wherein the composition includes: (a) a first part including: (i) at least one curable (meth)acrylate component; (ii) a free-radical initiator component; and (iii) a phosphate ester component in an amount sufficient to achieve a tensile strength on a galvanized surface of at least about 1000 psi when measured after humidity aging at 85% relative humidity and 85° C. for 250 hours; and (b) a second part including an accelerator component, wherein at least the first part or the second part also includes a corrosion inhibitor.

In another aspect of the invention, there is provided a process for inhibiting corrosion on a galvanized surface including the steps of: 1.) applying to a galvanized substrate surface a composition including: (a) a first part including: (i) at least one curable (meth)acrylate component; (ii) a free-radical initiator component; and (iii) a phosphate ester component in an amount sufficient to achieve a tensile strength on a galvanized surface of at least about 1000 psi when measured after humidity aging at 85% relative humidity and 85° C. for 250 hours; and (b) a second part including an accelerator component, and 2.) subjecting the composition-applied substrate surface to conditions sufficient to allow the composition to cure, wherein at least the first part or the second part also includes a corrosion inhibitor.

In another aspect of the invention, there is provided a composition including the reaction product of: (a) a first part including: (i) at least one curable (meth)acrylate component; (ii) a free-radical initiator component; and (iii) a phosphate ester component in an amount sufficient to achieve a tensile strength on a galvanized surface of at least about 1000 psi when measured after humidity aging at 85% relative humidity and 85° C. for 250 hours; and (b) a second part including an accelerator, wherein at least the first part or the second part also includes a corrosion inhibitor.

In another aspect of the invention, there is provided an article of manufacture including at least two substrate surfaces bonded together with a curable composition for bonding galvanized surfaces, wherein at least one of the substrate surfaces is galvanized and wherein the composition includes: (a) a first part including: (i) at least one curable (meth)acrylate component; (ii) a free-radical initiator component; and (iii) a phosphate ester component in an amount sufficient to achieve a tensile strength on a galvanized surface of at least about 1000 psi when measured after humidity aging at 85% relative humidity and 85° C. for 250 hours; and (b) a second part including an accelerator component, wherein at least the first part or the second part also includes a corrosion inhibitor.

In another aspect of the invention, there is provided a curable composition for bonding galvanized surfaces including: (a) a first part including: (i) at least one curable (meth)acrylate component; (ii) an accelerator; and (iii) a phosphate ester component in an amount sufficient to achieve a tensile strength on a galvanized surface of at least about 1000 psi when measured after humidity aging at 85% relative humidity and 85° C. for 250 hours; and (b) a second part including: (i) a carrier component and (ii) a free radical initiator component, wherein at least the first part or the second part also includes a corrosion inhibitor.

In another aspect of the invention, there is provided a method for preparing a composition for bonding galvanized surfaces including: (a) forming a first part by admixing at least one curable (meth)acrylate component, an accelerator, and a phosphate ester component, wherein the phosphate ester component is present in an amount sufficient to achieve a tensile strength on a galvanized surface of at least about 1000 psi when measured after humidity aging at 85% relative humidity and 85° C. for 250 hours;

(b) forming a second part by admixing at least one carrier component and at least one free radical initiator component; and (c) combining parts (a) and (b) under conditions sufficient to effectuate cure, wherein a corrosion inhibitor is admixed with at least the first part or the second part.

In another aspect of the invention, there is provided a method for using a curable composition to bond together two substrates, including the steps of: (a) applying the composition to a first substrate surface; (b) mating the surface of a second substrate in abutting relationship with composition-applied first substrate surface to form an assembly; and (c) maintaining the abutting relationship for a time sufficient to allow the composition to cure, wherein at least one of the abutting substrate surfaces is galvanized and wherein the composition includes: (a) a first part including: (i) at least one curable (meth)acrylate component; (ii) an accelerator; and (iii) a phosphate ester component in an amount sufficient to achieve a tensile strength on a galvanized surface of at least about 1000 psi when measured after humidity aging at 85% relative humidity and 85° C. for 250 hours; and (b) a second part including: (i) a carrier component and (ii) a free radical initiator component, wherein at least the first part or the second part also includes a corrosion inhibitor.

In another aspect of the invention, there is provided a process for inhibiting corrosion on a galvanized surface including the steps of: 1.) applying to a galvanized substrate surface a composition including: (a) a first part including: (i) at least one curable (meth)acrylate component; (ii) an accelerator; and (iii) a phosphate ester component in an amount sufficient to achieve a tensile strength on a galvanized surface of at least about 1000 psi when measured after humidity aging at 85% relative humidity and 85° C. for 250 hours; and (b) a second part including: (i) a carrier component and (ii) a free radical initiator component, and 2.) subjecting the composition-applied substrate surface to conditions sufficient to allow the composition to cure, wherein at least the first part or the second part also includes a corrosion inhibitor.

In another aspect of the invention, there is provided a composition including the reaction product of: (a) a first part including: (i) at least one curable (meth)acrylate component; (ii) an accelerator; and (iii) a phosphate ester component in an amount sufficient to achieve a tensile strength on a galvanized surface of at least about 1000 psi when measured after humidity aging at 85% relative humidity and 85° C. for 250 hours; and (b) a second part including: (i) a carrier component and (ii) a free radical initiator component, wherein at least the first part or the second part also includes a corrosion inhibitor.

In another aspect of the invention, there is provided an article of manufacture including at least two substrate surfaces bonded together with a curable composition for bonding galvanized surfaces, wherein at least one of the substrate surfaces is galvanized and wherein the composition includes: (a) a first part including: (i) at least one curable (meth)acrylate component; (ii) an accelerator; and (iii) a phosphate ester component in an amount sufficient to achieve a tensile strength on a galvanized surface of at least about 1000 psi when measured after humidity aging at 85% relative humidity and 85° C. for 250 hours; and (b) a second part including: (i) a carrier component and (ii) a free radical initiator component, wherein at least the first part or the second part also includes a corrosion inhibitor.

In another aspect of the invention, there is provided a curable composition for bonding galvanized surfaces including: (a) a first part including: (i) at least one curable (meth)acrylate component; (ii) a free-radical initiator component; (iii) a phosphate ester component; and (iv) an organic acid component in an amount sufficient to achieve a tensile strength on a galvanized surface of at least about 2500 psi at room temperature; and (b) a second part including an accelerator component.

In another aspect of the invention, there is provided a method for preparing a composition for bonding galvanized surfaces including: (a) forming a first part by admixing at least one curable (meth)acrylate component, at least one free-radical initiator component, a phosphate ester component, and an organic acid component in an amount sufficient to achieve a tensile strength on a galvanized surface of at least about 2500 psi at room temperature; (b) forming a second part including at least one accelerator component; and (c) combining parts (a) and (b) under conditions sufficient to effectuate cure.

In another aspect of the invention, there is provided a method for using a curable composition to bond together two substrates, including the steps of: (a) applying the composition to a first substrate surface; (b) mating the surface of a second substrate in abutting relationship with composition-applied first substrate surface to form an assembly; and (c) maintaining the abutting relationship for a time sufficient to allow the composition to cure, wherein at least one of the abutting surfaces is galvanized and wherein the composition includes: (a) a first part including: (i) at least one curable (meth)acrylate component; (ii) a free-radical initiator component; (iii) a phosphate ester component; and (iv) an organic acid component in an amount sufficient to achieve a tensile strength on a galvanized surface of at least about 2500 psi at room temperature; and (b) a second part including an accelerator component.

In another aspect of the invention, there is provided a process for inhibiting corrosion on a galvanized surface including the steps of: 1.) applying to a galvanized substrate surface a composition including: (a) a first part including: (i) at least one curable (meth)acrylate component; (ii) a free-radical initiator component; (iii) a phosphate ester component; and (iv) an organic acid component in an amount sufficient to achieve a tensile strength on a galvanized surface of at least about 2500 psi at room temperature; and (b) a second part including an accelerator component, and 2.) subjecting the composition-applied substrate surface to conditions sufficient to allow the composition to cure.

In another aspect of the invention, there is provided a composition including the reaction product of: (a) a first part including: (i) at least one curable (meth)acrylate component; (ii) a free-radical initiator component; (iii) a phosphate ester component; and (iv) an organic acid component in an amount sufficient to achieve a tensile strength on a galvanized surface of at least about 2500 psi at room temperature; and (b) a second part including an accelerator.

In another aspect of the invention, there is provided an article of manufacture including at least two substrate surfaces bonded together with a curable composition for bonding galvanized surfaces, wherein at least one of the substrate surfaces is galvanized and wherein the composition includes: (a) a first part including: (i) at least one curable (meth)acrylate component; (ii) a free-radical initiator component; (iii) a phosphate ester component; and (iv) an organic acid component in an amount sufficient to achieve a tensile strength on a galvanized surface of at least about 2500 psi at room temperature; and (b) a second part including an accelerator component.

In another aspect of the invention, there is provided a curable composition for bonding galvanized surfaces including: (a) a first part including: (i) at least one curable (meth)acrylate component; (ii) an accelerator; (iii) a phosphate ester component; and (iv) an organic acid component in an amount sufficient to achieve a tensile strength on a galvanized surface of at least about 2500 psi at room temperature; and (b) a second part including: (i) a carrier component and (ii) a free radical initiator component.

In another aspect of the invention, there is provided a method for preparing a composition for bonding galvanized surfaces including: (a) forming a first part by admixing at least one curable (meth)acrylate component, a free radical initiator component, a phosphate ester component, and an organic acid component in an amount sufficient to achieve a tensile strength on a galvanized surface of at least about 2500 psi at room temperature; (b) forming a second part including at least one accelerator component; and (c) combining parts (a) and (b) under conditions sufficient to effectuate cure.

In another aspect of the invention, there is provided a method for using a curable composition for bonding galvanized surfaces, including the steps of: (a) applying the composition to a first substrate surface; (b) mating the surface of a second substrate in abutting relationship with composition-applied first substrate surface to form an assembly; and (c) maintaining the abutting relationship for a time sufficient to allow the composition to cure, wherein at least one of the abutting surfaces is galvanized, and wherein the composition includes: (a) a first part including: (i) at least one curable (meth)acrylate component; (ii) an accelerator; (iii) a phosphate ester component; and (iv) an organic acid component in an amount sufficient to achieve a tensile strength on a galvanized surface of at least about 2500 psi at room temperature; and (b) a second part including: (i) a carrier component and (ii) a free radical initiator component.

In another aspect of the invention, there is provided a process for inhibiting corrosion on a galvanized surface including the steps of: 1.) applying to a galvanized substrate surface a composition including: (a) a first part including: (i) at least one curable (meth)acrylate component; (ii) an accelerator; (iii) a phosphate ester component; and (iv) an organic acid component in an amount sufficient to achieve a tensile strength on a galvanized surface of at least about 2500 psi at room temperature; and (b) a second part including: (i) a carrier component and (ii) a free radical component, and 2.) subjecting the composition-applied substrate surface to conditions sufficient to allow the composition to cure.

In another aspect of the invention, there is provided a composition including the reaction product of: (a) a first part including: (i) at least one curable (meth)acrylate component; (ii) an accelerator; (iii) a phosphate ester component; and (iv) an organic acid component in an amount sufficient to achieve a tensile strength on a galvanized surface of at least about 2500 psi at room temperature; and (b) a second part including: (i) a carrier component and (ii) a free radical initiator component.

In another aspect of the invention, there is provided an article of manufacture including at least two substrate surfaces bonded together with a curable composition, wherein at least one of the substrate surfaces is galvanized and wherein the composition includes: (a) a first part including: (i) at least one curable (meth)acrylate component; (ii) an accelerator; (iii) a phosphate ester component; and (iv) an organic acid component in an amount sufficient to achieve a tensile strength on a galvanized surface of at least about 2500 psi at room temperature; and (b) a second part including: (i) a carrier component and (ii) a free radical initiator component.

In another aspect of the invention, there is provided a curable composition for bonding galvanized surfaces including: (a) a first part including: (i) at least one curable (meth)acrylate component; (ii) a free-radical initiator component; (iii) a phosphate ester component; and (iv) an organic acid component in an amount sufficient to achieve a tensile strength on a galvanized surface of at least about 800 psi when measured after humidity aging at 85% relative humidity and 85° C. for 250 hours; and (b) a second part including an accelerator component.

In another aspect of the invention, there is provided a method for preparing a composition for bonding galvanized surfaces including: (a) forming a first part by admixing at least one curable (meth)acrylate component, an accelerator, a phosphate ester component, and an organic acid component in an amount sufficient to achieve a tensile strength on a galvanized surface of at least about 800 psi when measured after humidity aging at 85% relative humidity and 85° C. for 250 hours; (b) forming a second part including at least one accelerator component; and (c) combining parts (a) and (b) under conditions sufficient to effectuate cure.

In another aspect of the invention, there is provided a method for using a curable composition to bond together two substrates, including the steps of: (a) applying the composition to a first substrate surface; (b) mating the surface of a second substrate in abutting relationship with composition-applied first substrate surface to form an assembly; and (c) maintaining the abutting relationship for a time sufficient to allow the composition to cure, wrein at least one of the abutting surfaces is galvanized and wherein the composition includes: (a) a first part including: (i) at least one curable (meth)acrylate component; (ii) a free-radical initiator component; (iii) a phosphate ester component; and (iv) an organic acid component in an amount sufficient to achieve a tensile strength on a galvanized surface of at least 800 psi when measured after humidity aging at 85% relative humidity and 85° C. for 250 hours; and (b) a second part including an accelerator component.

In another aspect of the invention, there is provided a process for inhibiting corrosion on a galvanized surface including the steps of: 1.) applying to a galvanized substrate surface a composition including: (a) a first part including: (i) at least one curable (meth)acrylate component; (ii) a free radical initiator component; (iii) a phosphate ester component; and (iv) an organic acid component in an amount sufficient to achieve a tensile strength on a galvanized surface of at least about 800 psi when measured after humidity aging at 85% relative humidity and 85° C. for 250 hours; and (b) a second part including an accelerator component; and 2.) subjecting the composition-applied substrate surface to conditions sufficient to allow the composition to cure.

In another aspect of the invention, there is provided a composition comprising the reaction product of: (a) a first part including: (i) at least one curable (meth)acrylate component; (ii) a free radical initiator component; (iii) a phosphate ester component; and (iv) an organic acid component in an amount sufficient to achieve a tensile strength on a galvanized surface of at least about 800 psi when measured after humidity aging at 85% relative humidity and 85° C. for 250 hours; and (b) a second part including an accelerator component.

In another aspect of the invention, there is provided an article of manufacture including at least two substrate surfaces bonded together with a curable composition for bonding galvanized surfaces, wherein at least one of the substrate surfaces is galvanized and wherein the composition includes: (a) a first part including: (i) at least one curable (meth)acrylate component; (ii) a free-radical initiator component; (iii) a phosphate ester component; and (iv) an organic acid component in an amount sufficient to achieve a tensile strength on a galvanized surface of at least about 800 psi when measured after humidity aging at 85% relative humidity and 85° C. for 250 hours; and (b) a second part including an accelerator component.

In another aspect of the invention, there is provided a curable composition for bonding galvanized surfaces including: (a) a first part including: (i) at least one curable (meth)acrylate component; (ii) an accelerator; (iii) a phosphate ester component; and (iv) an organic acid component in an amount sufficient to achieve a tensile strength on a galvanized surface of at least about 800 psi when measured after humidity aging at 85% relative humidity and 85° C. for 250 hours; and (b) a second part including: (i) a carrier component and (ii) a free radical initiator component.

In another aspect of the invention, there is provided a method for preparing a composition for bonding galvanized surfaces including: (a) forming a first part by admixing at least one curable (meth)acrylate component, an accelerator, a phosphate ester component, and an organic acid component in an amount sufficient to achieve a tensile strength on a galvanized surface of at least about 800 psi when measured after humidity aging at 85% relative humidity and 85° C. for 250 hours; (b) forming a second part including: (i) a carrier component and (ii) a free radical initiator component; and (c) combining parts (a) and (b) under conditions sufficient to effectuate cure.

In another aspect of the invention, there is provided a method for using a curable composition to bond together two substrates, including the steps of: (a) applying the composition to a first substrate surface; (b) mating the surface of a second substrate in abutting relationship with composition-applied first substrate surface to form an assembly; and (c) maintaining the abutting relationship for a time sufficient to allow the composition to cure, wherein at least one of the abutting surfaces is galvanized and wherein the composition includes: (a) a first part including: (i) at least one curable (meth)acrylate component; (ii) an accelerator; (iii) a phosphate ester component; and (iv) an organic acid component in an amount sufficient to achieve a tensile strength on a galvanized surface of at least about 800 psi when measured after humidity aging at 85% relative humidity and 85° C. for 250 hours; and (b) a second part including: (i) a carrier component and (ii) a free radical initiator component.

In another aspect of the invention, there is provided a process for inhibiting corrosion on a galvanized surface including the steps of: 1.) applying to a galvanized substrate surface a composition including: (a) a first part including: (i) at least one curable (meth)acrylate component; (ii) an accelerator; (iii) a phosphate ester component; and (iv) an organic acid component in an amount sufficient to achieve a tensile strength on a galvanized surface of at least about 800 psi when measured after humidity aging at 85% relative humidity and 85° C. for 250 hours; and (b) a second part including: (i) a carrier component and (ii) a free radical initiator component; and 2.) subjecting the composition-applied substrate surface to conditions sufficient to allow the composition to cure.

In another aspect of the invention, there is provided a composition including the reaction product of: (a) a first part including: (i) at least one curable (meth)acrylate component; (ii) an accelerator; (iii) a phosphate ester component; and (iv) an organic acid component in an amount sufficient to achieve a tensile strength on a galvanized surface of at least about 800 psi when measured after humidity aging at 85% relative humidity and 85° C. for 250 hours; and (b) a second part including: (i) a carrier component and (ii) a free radical initiator component.

In another aspect of the invention, there is provided an article of manufacture including at least two substrate surfaces bonded together with a curable composition for bonding galvanized surfaces, wherein at least one of the substrate surfaces is galvanized and wherein the composition includes: (a) a first part including: (i) at least one curable (meth)acrylate component; (ii) an accelerator; (iii) a phosphate ester component; and (iv) an organic acid component in an amount sufficient to achieve a tensile strength on a galvanized surface of at least about 800 psi when measured after humidity aging at 85% relative humidity and 85° C. for 250 hours; and (b) a second part including: (i) a carrier component and (ii) a free radical initiator component.

DETAILED DESCRIPTION OF THE INVENTION

The present invention is directed to compositions for bonding galvanized surfaces, to methods of preparing such compositions, and to methods of using such compositions to bond together substrates, particularly galvanized substrate surfaces. Moreover, the present invention is directed to processes that utilize the present inventive compositions to inhibit corrosion on galvanized surfaces.

The present inventive compositions include two parts, i.e., a first part and a second part. In particular, they are formulated to include (i) a first part that includes at least one (meth)acrylate component in combination with free radical initiator component and a phosphate ester component and a second part that includes at least one accelerator component or (ii) a first part that includes at least one (meth)acrylate component in combination with an accelerator and a phosphate ester component and a second part that includes a carrier component and a free radical initiator component. Moreover, it is desirable to include a corrosion inhibitor, as well as an organic acid component, in the present inventive compositions.

Useful (meth)acrylate components can be chosen from a wide variety of materials represented by the following formula:

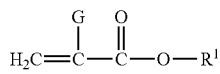

where G may be hydrogen, halogen or alkyl of 1 to about 4 carbon atoms, and $R^1$ may be selected from alkyl, cycloalkyl, alkenyl, cycloalkenyl, alkaryl, aralkyl or aryl groups of 1 to about 16 carbon atoms, any of which may be optionally substituted or interrupted as the case may be with silane, silicon, oxygen, halogen, carbonyl, hydroxyl, ester, carboxylic acid, urea, urethane, carbamate, amine, amide, sulfur, sulfonate, sulfone, and the like.

Additionally, useful (meth)acrylate components can be chosen from the alkylene glycol diacrylates having the general formula:

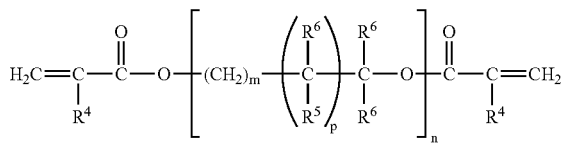

wherein $R_4$ is selected from the group consisting of hydrogen, halogen, and lower alkyl of 1–4 carbon atoms; $R_5$ is selected from the group consisting of hydrogen, —OH,

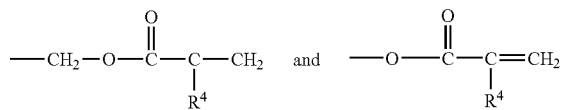

$R_6$ is a radical selected from the group consisting of hydrogen, lower alkyl of 1–4 carbon atoms, hydroxyalkyl of 1–4 carbon atoms, and m is an integer equal to at least 1, desirably 1–8 and more desirably from 1 to 4; n is an integer equal to at least 1, desirably, 1 to 20; and p is 0 or 1.

Typical of these monomers are mono-, di-, tri-tetra- and polyethylene glycol dimethacrylate and the corresponding diacrylates; di(pentamethylene glycol) dimethacrylate; tetraethylene glycol di(chloroacrylate); diglycerol diacrylate; diglycerol tetramethacrylate; butylene glycol dimethacrylate; neopentyl glycol diacrylate; and trimethylopropane triacrylate.

Particularly useful polymerizable crosslinkable components that can be used as the (meth)acrylate component are ethoxylated trimethyloipropane triacrylate, trimethylol propane trimethacrylate, dipentaerythritol monohydroxypentacrylate, pentaerythritol triacrylate, ethoxylated trimethyloipropane triacrylate, 1,6-hexanedioldiacrylate, neopertyl glycoldiacrylate, pentaerythritol tetraacrylate, 1,2-butylene glycoldiacrylate, trimethylopropane ethoxylate tri(meth)acrylate, glyceryl propoxylate tri(meth)acrylate, trimethyloipropane tri(meth)acrylate, dipentaerythritol monohydroxy penta(meth)acrylate, tri(propylene glycol) di(meth)acrylate, neopentyiglycol propoxylate di(meth)acrylate, 1,4-butanediol di(meth)acrylate, polyethyleneglycol di(meth)acrylate, triethyleneglycol di(meth)acrylate, butylene glycol di(meth)acrylate, ethoxylated bisphenol A di(meth)acrylate and combinations thereof. Moreover, MHOROMER® BM 905 hydroxy ethyl methacrylate monomer (HEMA) can be incorporated in the present inventive compositions as the (meth)acrylate component.

Various useful urethane-acrylate monomers, such as those described in U.S. Pat. No. 3,425,988 to Gorman, and U.S. Pat. No. 4,309,526 to Baccei, each of which are incorporated herein by reference, also may be used as the (meth)acrylate component. The monomers disclosed in the '526 patent may be viewed as one-component polymerizable block copolymers (prepolymers) having rigid and flexible segments. This achieved by the chemical linking of precursor "prepolymers" which are subsequently "capped" with (meth)acrylate functionality.

Moreover, acrylates derived from bisphenol-A, such as bisphenol-A dimethacrylate, hydrogenated bisphenol-A dimethacrylate, and ethoxylated bisphenol-A dimethacrylate also may be used as the (meth)acrylate component.

Furthermore, while di- and other polyacrylate esters have been found particularly desirable, monofunctional acrylate esters (esters containing one acrylate group) also may be used as the (meth)acrylate component. When dealing with monofunctional acrylate esters, it is desirable to use an ester which has a relatively polar alcoholic moiety. Such materials are less volatile than low molecular weight alkyl esters and, more importantly, the polar group tends to provide intermolecular attraction during and after cure, thus producing more desirable cure properties, as well as a more durable sealant or adhesive. Particularly desirable are the polar groups selected from labile hydrogen, heterocyclic ring, hydroxy, amino, cyano, and halogen polar groups. Useful examples of compounds within this category include cyclohexyl methacrylate, tetrahydrofurfuryl methacrylate, hydroxyethyl acrylate, hydroxypropyl methacrylate, t-butylaminoethyl methacrylate, cyanoethylacrylate, and chloroethyl methacrylate. The materials are often incorporated as reactive diluents which are capable of copolymerizing with the various other polymerizable materials.

Other unsaturated reactive diluents, such as styrene and acrylonitrile, also can be used. When used, the concentration of such diluents should be less than about 60 percent by weight, and preferably about 10 to about 40 percent by weight of the total composition. As used herein, the phrase total composition refers to a composition having a first part and a second part.

A particularly useful curable (meth)acrylate component for use in the present inventive compositions is methyl methacrylate. The useful amounts of (meth)acrylate component typically range from about 40% by weight to about 70% by weight of the total composition.

A number of well-known initiators of free radical polymerization may be incorporated in the present invention as the free-radical initiator component. Peroxides and peresters are particularly useful. For example, suitable initiators of free radical polymerization include, without limitation, cumene hydroperoxide (CHP), paramenthane hydroperoxide, tertiary butyl hydroperoxide (TBH), tertiary butyl perbenzoate (TBPB), and benzoyl peroxide (BPO). The useful amounts of free-radical initiator component typically range from about 0.5% by weight to about 3% by weight of the total composition.

The compositions of the present invention can include any suitable phosphate ester. Suitable phosphate esters for use in the present invention include those represented by the formula:

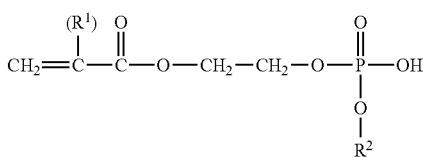

wherein $R^1$ is H or $CH_3$, and $R^2$ is H, and wherein $R^2$ can additionally include:

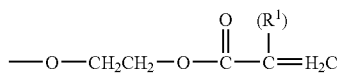

wherein $R^1$ is H or $CH_3$. A particularly useful phosphate ester for use in the present invention is HEMA phosphate ester, which is sold under the trademark T-MULZ® 1228.

Desirably, the phosphate ester component is present in the inventive compositions in an amount sufficient to achieve a tensile strength on a galvanized surface of at least about 1000 psi when measured after humidity aging at 85% relative humidity and 85° C. for 250 hours. Moreover, the phosphate ester component is desirably present in the inventive compositions in an amount sufficient to achieve a tensile strength on a galvanized surface of at least about 2500 psi at room temperature. More particularly, the phosphate ester component is present in an amount sufficient to achieve at least a 20% increase in tensile strength on galvanized surfaces as compared to compositions not containing a phosphate ester component. The useful amounts of phosphate ester component typically range from about 2% by weight to about 5% by weight of the total composition.

Various accelerator compounds, such as tertiary amines, imides, polyamines, cyclicamines, and arylamines can be included in the compositions of the present invention to further increase cure speeds and completion of cure. See, e.g., U.S. Pat. No. 3,041,322 tertiary amines, U.S. Pat. No. 3,046,262 (imides), U.S. Pat. No. 3,203,941 (polyamines), U.S. Pat. No. 3,218,305 (cyclic and arylamines), and U.S. Pat. No. 3,591,438, all to Kriebel, the disclosures of which are all incorporated herein by refernce.

Other useful accelerators for the present invention include compounds having the following formula:

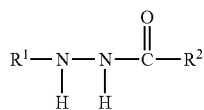

wherein $R^1$ is selected from alkyl from 2 to 6 carbon atoms, cycloalkyl, aryl, alkenyl, and cycloalkenyl and $R^2$ is selected from hydrogen, alkyl, cycloalkyl, alkenyl and cycloalkenyl, aryl, alkoxy, aryloxy, carbonyl, amino, and the following groups:

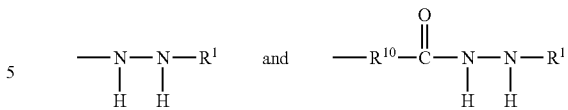

wherein $R^{10}$ is selected from alkyl groups containing one to about 10 carbon atoms, alkenyl groups containing two to about 10 carbon atoms, and aryl groups containing up to about 10 carbon atoms. Examples of useful accelerator compounds include 1-acetyl-2-phenyl hydrazine, 1-acetyl-2 (p-tolyl) para-toluene sulfonyl hydrazide, 1-formyl-2-phenyl hydrazine and combinations thereof.

Particularly useful accelerators that can be incorporated in the present inventive compositions include pyridine derivatives having the formula:

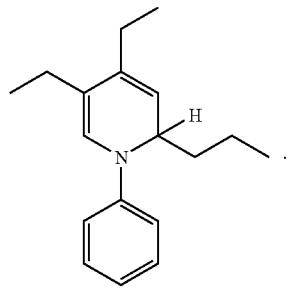

One particularly useful pyridine derivative is sold under the trademark RIEILLCAT® ASY-2.

Suitable accelerators for the free-radical initiator component include phenyl dihydro pyridine (PDHP), transition metals, such as copper, cobalt, magnesium, vanadium, manganese, iron, and salts and complexes thereof, saccharin, and alkylated aromatic amines, such as dimethyl p-toluidine (DMPT), and derivatives of alkylated aromatic amines. Metal salt solutions such as copper salt solutions are particularly useful. More particularly, acetyl acetone metal complexes such as 2,4-pentane dione/copper complexes and naphthenate/copper complexes are useful. For example, the commercially available IM2231 (copper naphthenate in methyl methacrylate) can be included in the present inventive compositions.

The useful amounts of accelerator typically range from about 0.1% by weight to about 6% by weight of the total composition. Desirably, PDHP is present in an amount from about 1% by weight to about 3% by weight of the total composition.

With respect to the present inventive compositions that include a first part that includes at least one curable (meth) acrylate component in combination with a free-radical initiator component and a phosphate ester component and a second part that includes an accelerator component, the free radical initiator component is desirably TBPB or CHP, and a catalyst (e.g., an amine or transition metal reducing agent) is desirably also included in the second part. When a peroxide and catalyst are included in such compositions, the ratio of peroxide to catalyst can be any suitable ratio. Suitable ratios of peroxide to catalyst include, for example, 1:1 to 10:1.

With respect to the present inventive compositions that include a first part that includes at least one curable (meth)

acrylate component in combination with an accelerator and a phosphate ester component and a second part that includes a free-radical initiator, the free-radical initiator component is desirably BPO, and a catalyst (e.g., DMPT) is desirably also included in the first part. When a peroxide and catalyst are included in such compositions, the ratio of peroxide to catalyst can be any suitable ratio. Suitable ratios of peroxide to catalyst include, for example, 1:1 to 10:1. Desirably, the ratio of peroxide to catalyst is 10:1.

Any suitable carrier component can be used in the present inventive compositions. The primary purpose of the carrier component is to serve as a vehicle for the accelerator, catalyst or free-radical initiator component in the second part. Suitable carrier components include, for example, reactive resins and non-reactive resins. Desirably, the reactive resin is a (meth)acrylate resin.

Any suitable corrosion inhibitor can be used in the present invention. Suitable non-limiting commercially available corrosion inhibitors include, for example, metal phospho-silicates and alkali metal phospho-silicates. Other useful inhibitors include, for example, phenols such as hydroquinone and quinones. Suitable inhibitors also include, for example, HALOX® SZP-391 (strontium zinc phosphosilicate), HALOX® CZ-170 (phosphate), HALOX® Z-PLEX 111 (phosphosilicate), SACI 760, COTROL® 18–8 (dialkylamino alkanoate, metal salt), COTROL® 316-FG (free flowing powder, based on calcium silico phosphate), COTROL® BMB (barium metaborate), COTROL® AMB (ammonium benzoate), VpCI 137 and VpCI 609® (Vapor Phase Corrosion Inhibitor), IIRGACOR® 252 LD (benzothiazole succinate), 8-hydroxyquinoline corrosion inhibitors, and combinations thereof. A particularly useful inhibitor is HALOX® CW-491 (calcium phosphosilicate).

The corrosion inhibitor can be present in the present inventive compositions in an amount sufficient to achieve a tensile strength on a galvanized surface of at least about 400 psi when measured after humidity aging at 85% relative humidity and 85° C. for 500 hours. The useful amounts of corrosion inhibitor typically range from about 1% by weight to about 15% by weight of the total composition. Desirably, the corrosion inhibitor is present in an amount from about 3% by weight to about 10% by weight of the total composition.

Any suitable organic acid component can be used in the present invention. Suitable organic acids include, for example, carboxylic acids. Suitable carboxylic acids include, for example, methacrylic acid, maleic acid, acrylic acid, fumeric acid, and acid derivatives of acrylic and methacrylic acid, such as beta carboxy ethyl acrylic acid (BCEA), and other carboxylic acids and derivatives thereof that would be known to one of ordinary skill in the art. A particularly useful organic acid that can be incorporated in the present inventive compositions is methacrylic acid.

Desirably, the organic acid component is incorporated in the present inventive compositions in an amount sufficient to achieve a tensile strength on a galvanized surface of at least about 2500 psi at room temperature. Moreover, the organic acid component is desirably incorporated in the present inventive compositions in an amount sufficient to achieve a tensile strength on a galvanized surface of at least about 800 psi when measured after humidity aging at 85% relative humidity and 85° C. for 250 hours.

The useful amounts of organic acid typically range from about 1% by weight to about 9% by weight of the total composition. Desirably, the organic acid is present in an amount of at least about 2% by weight of the total composition and, more desirably, about 3% by weight to about 5% by weight of the total composition.

Desirably, methacrylic acid is present in an amount of about 1% by weight to about 9% by weight of the total composition. More desirably, methacrylic acid is present in an amount of about 2% by weight of the total composition to about 4% by weight of the composition.

Any suitable toughening component can be used in the present invention. In particular, the toughening component of the present invention can be chosen from a wide variety of elastomeric materials that form discrete particles or biphasic domains in a continuous resin matrix. For example, prereacted particles of polyacrylate, styrene/butadiene/styrene (SBS) copolymers, styrene/isoprene/styrene (SIS) copolymers, styrene/butadiene (SBR) copolymers, as well as other prereacted materials may be added in particulate form to the resin composition. A partial listing of useful prereacted elastomer rubbers includes prereacted elastomer particles selected from the group consisting of acrylate-butadiene, butadiene, chloroprene, ethylene-propylene, ethylene-propylene-diene, isoprene, isobutylene, isobutylene-isoprene (butyl rubber), styrene-butadiene, styrene-isoprene, acrylonitrile-butadiene, acrylonitrile-chloroprene, vinylpyridine-butadiene, vinylpyridine-styrene-butadiene, carboxylic-styrene-butadiene, chloroisobutylene-isoprene (chlorobutyl rubber), bromoisobutylene-isoprene (bromobutyl rubber), dialkysiloxane, poly(propylene oxide), polyesterurethanes, polyetherurethanes, and mixtures thereof. Moreover, reactive liquid polymers (RLP's) also can be incorporated as the toughening component. RLP's contain functional groups, usually on their terminal ends but occasionally as pendant groups, and react with the resin in situ to form elastomeric domains. Examples of RLP's include, without limitation, carboxy-terminated butadiene nitrile (CTBN), amine-terminated butadiene nitrile (ATBN), hydroxy-terminated butadiene nitrile (HTBN), epoxy-terminated butadiene nitrile (ETBN), mercapto-terminated butadiene nitril (MTPN), and phenoxy-terminated butadiene nitrile (PTBN).

Particularly useful agents that can be utilized as the toughening component include, for example, Blendex 338, nitrile rubber, and chlorosulfonated polyethylenes represented by the structure:

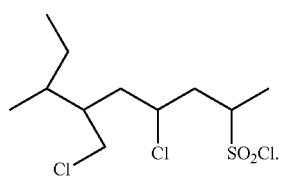

Particularly useful chlorosulfonated polyethylenes include, for example, Hypalon 20 and Hypalon 30.

The useful amounts of the toughening component typically range from about 5% by weight to about 60% by weight of the total composition. Desirably, the toughening component is present in an amount of about 10% by weight to about 50% by weight of the total composition.

Chelating agents also may be employed to control and prevent premature peroxide decomposition and polymerization, as well as to remove trace amounts of metal contaminants. Examples of useful chelating agent are the tetrasodium salt of ethylenediamine tetraacetic acid (EDTA) and butylated hydroxy toluene (BHT). Useful amounts of a chelating agent typically range from about 0.01% by weight to about 2% by weight of the total composition. Desirably, the chelating agent is present in an amount of from about 0.02% by weight to about 0.2% by weight of the total composition.

Any suitable antioxidant can be included in the present inventive compositions. Particularly useful antioxidants are phenolic antioxidants, such as Naugard BHT and hydroquinone. Useful amounts of antioxidants typically range from about 10 ppm to about 3% by weight of the total composition. Desirably, antioxidants are present in an amount of from about 0.5% by weight to about 1.5% by weight of the total composition.

Any suitable thixotrope can be included in the present inventive compositions. Suitable thixotropic agents include, for example, Disparlon 6100, Disparlon 6200, organo clay, and polyamide powder. Useful amounts of thixotropes typically range from about 0% by weight to about 10% by weight of the total composition. Desirably, a thixotrope is present in an amount from about 0.5% to about 3% by weight of the total composition.

Any suitable blooming agent can be included in the present inventive compositions. A suitable blooming agent is, for example, paraffin wax. Useful amounts of wax typically range from about 0.1% by weight to about 3% by weight of the total composition. Preferably, wax is present in an amount from about 0.2% by weight to about 1.5% by weight of the total composition.

Any suitable filler can be included in the present inventive compositions. Suitable fillers include, for example, nephyline syenite, alkali metal carbonates, and silicas. Useful amounts of filler typically range from about 0% to about 70% by weight of the total composition. Desirably, fillers are present in an amount from about 0% by weight to about 10% by weight of the total composition.

Other agents such as thickeners, plasticizers, elastomers, thermoplastics, coloring agents, shelf-life extenders (for example, zinc chloride), industrial microbiostats (for example, zinc omadine® powder), surfactants or wetting agents, polymerization inhibitors, stabilizers, viscosity modifiers, adhesion promoters, and other well-known additives also may be incorporated where functionally desirable. Moreover, spacer beads (such as 5 mil glass beads) also may be included to control bond line thickness.

The present inventive compositions can be applied to any suitable substrate in accordance with the present inventive methods and processes. It is particularly useful to apply the present inventive compositions to surfaces that are known to be difficult to bond together, such as flaky and smooth galvanized (i.e., zinc-coated or zinc-alloy coated) surfaces.

In that regard, it is well-known that, when attempting to bond together galvanized surfaces by means of conventional adhesive compositions, initial adhesion is often lost due to the exchange of the attachment site on the galvanized surface for water (due to the fact that zinc coordination to the adhesive composition is less preferred than water). Furthermore, exchange of the attachment site promotes rapid corrosion, which can be exacerbated by contaminants in the grain boundaries on the galvanized surfaces. Moreover, it is well-known that the surface morphology of flaky galvanized surfaces renders them more difficult to bond together as opposed to smooth galvanized surfaces (because water more easily replaces the coordination with zinc when the galvanized surface is flaky).

As illustrated in the examples set forth below, the present inventive compositions, however, unexpectedly demonstrate superior bond strength on both flaky and galvanized surfaces under various conditions, particularly under conditions of heat and humidity. Moreover, the present inventive compositions can be used in accordance with the present inventive processes for inhibiting corrosion on galvanized surfaces, thereby minimizing and/or preventing corrosion that can occur on galvanized surfaces over prolonged periods of time.

EXAMPLES

Table I below shows various compositions which were made. Composition A is a commercially available composition. Compositions B–G and I–K represent the inventive compositions made in accordance with the present invention.

TABLE 1

Inventive Compositions B–G and I–K

| Component | Prior Art A Wt % | B Wt. % | C Wt. % | D Wt. % | E Wt. % | F Wt. % | G Wt. % | I Wt. % | J Wt. % | K Wt. % |
|---|---|---|---|---|---|---|---|---|---|---|
| HYPALON ® 30 polyolefin resin (toughener) | 10.12 | 19.40 | 14.23 | 14.23 | 13.93 | 13.90 | 17.80 | 14.02 | 12.86 | 12.90 |
| METHYL METHACRYLATE (MA) | 51.51 | 44.77 | 53.48 | 52.74 | 51.40 | 51.27 | 41.53 | 48.72 | 50.60 | 50.47 |
| NAUGARD ® BHT antioxidant | 1.76 | 0.88 | 0.65 | 0.65 | 0.63 | 0.63 | 0.81 | 0.64 | 0.58 | 0.59 |
| SODIUM EDTA SALT (chelator) | 0.04 | 0.18 | 0.13 | 0.13 | 0.13 | 0.13 | 0.16 | 0.13 | 0.12 | 0.12 |
| HYDROQUINONE | 0.09 | 0.09 | 0.06 | 0.06 | 0.06 | 0.06 | 0.08 | 0.06 | 0.06 | 0.06 |
| BLENDEX ® 338 synthetic resin (toughener) | 19.14 | 15.08 | 16.87 | 16.65 | 16.24 | 16.20 | 13.99 | 15.65 | 15.90 | 15.97 |
| WAX | 0.19 | 0.37 | 0.39 | 0.39 | 0.38 | 0.38 | 0.34 | 0.39 | 0.37 | 0.37 |
| t-ButylPerBenzoate | 0.82 | 0.88 | 0.65 | 0.65 | 0.63 | 0.63 | 0.81 | 0.64 | 0.58 | 0.59 |
| Accelerator[1] | 1.69 | 1.69 | 1.33 | 1.29 | 1.25 | 1.25 | 1.69 | 1.67 | 1.66 | 1.69 |
| MHORMER ® BM-905 monomer | 9.68 | 10.41 | 7.63 | 7.63 | 7.47 | 7.46 | 9.55 | 7.52 | 6.90 | 6.92 |
| Surfactant | — | — | — | — | — | 0.13 | — | — | — | — |

TABLE 1-continued

Inventive Compositions B–G and I–K

| Component | Prior Art A Wt % | B Wt. % | C Wt. % | D Wt. % | E Wt. % | F Wt. % | G Wt. % | I Wt. % | J Wt. % | K Wt. % |
|---|---|---|---|---|---|---|---|---|---|---|
| 5 MIL GLASS BEADS | — | — | — | — | — | — | — | 0.20 | 0.20 | 0.20 |
| Thixotropic agent | — | — | — | — | — | — | — | 0.33 | 0.33 | 0.33 |
| Thixotropic agent | 0.86 | — | — | — | — | — | — | — | — | — |
| ZINC CHLORIDE | 0.04 | — | — | — | — | — | — | — | — | — |
| TiO2 | — | — | — | — | — | — | — | 0.40 | 0.40 | 0.10 |
| BLACK DISP'N RV-262 | — | — | — | — | — | — | — | 0.08 | 0.15 | — |
| Yellow Dye | — | — | — | — | — | — | — | — | — | 0.04 |
| Catalyst[2] | — | — | — | — | — | — | — | — | — | 0.01 |
| Blue Dye | — | — | — | — | — | — | — | — | — | 0.02 |
| METHACRYLIC ACID | 1.41 | 3.53 | 2.59 | 2.59 | 2.53 | 2.53 | 3.24 | 2.55 | 2.34 | 2.34 |
| Phosphate Ester[3] | 2.64 | 2.73 | 2.00 | 2.00 | 2.00 | 2.00 | 2.73 | 2.00 | 1.99 | 1.99 |
| Calcium Phosphosilicate[4] | — | — | — | — | — | — | 7.27 | — | 5.30 | 5.32 |
| BARIUM METABORATE[5] | — | — | — | — | — | — | — | 5.00 | — | — |
| Benzothiazole succinate[6] | — | — | — | — | 1.33 | 1.33 | — | — | — | — |
| Inhibitor[7] | — | — | — | 1.00 | — | 0.60 | — | — | — | — |
| Bacterioside | — | — | — | — | 2.00 | 1.50 | — | — | — | — |
| Total Percentage | 100 | 100 | 100 | 100 | 100 | 100 | 100 | 100 | 100 | 100 |
| Total Acid (T-MULZ ® emulsifier + MA) | 4.05 | 6.25 | 4.59 | 4.59 | 4.53 | 4.53 | 5.96 | 4.55 | 4.33 | 4.34 |

[1]Pyridine derivative sold under tradename REILLCAT ® ASY-2 pyridine derivative.
[2]Copper naphthenate in methyl methacrylate
[3]T-MULZ ® 1228 emulsifier sold by Hacros Organics, Kansas City, MO.
[4]Corrosion inhibitor (HALOX ® CW 491) sold by Halox Pigments, Hammond, IN.
[5]Corrosion inhibitor available from Caschem, Inc., Bayonne, NJ.
[6]Corrosion inhibitor IRGACOR ® 252 LD corrosion inhibiting additive, sold by Vanticor.
[7]8-Hydroxyquinoline.

Example 1

This example demonstrates the superior ability of the present inventive compositions to bond to flaky galvanized surfaces.

Compositions A, C, I, and J were prepared in accordance with Table 1. Composition A is a commercially available sold by Henkel Loctite (Hysol 4500). Compositions C, I, and J are inventive compositions. As set forth in Table 1, Compositions A, C, I, and J all contained a phosphate ester component (i.e., T-Mulz 1228) in combination with methacrylic acid, with inventive Compositions C, I, and J containing at least 2 wt. % of methacrylic acid. Moreover, inventive Compositions I and J also contained a corrosion inhibitor.

Lap shear specimens were prepared for Composition A, which served as a comparative prior art composition, and for inventive Compositions C, I, and J using flaky, hot-dipped galvanized steel substrates. The specimens had a ½ inch by 1 inch overlap and 0.000–0.005 inch bond line gap.

Tensile lap strengths (TLS) were measured under several conditions: at room temperature; after humidity aging for 250 hours at 85° C. and 85% relative humidity; after humidity aging for 500 hours at 85° C. and 85% relative humidity; after humidity aging for 750 hours at 85° C. and 85% relative humidity; and after humidity aging at 85° C. and 85% relative humidity for 1000 hours. Additionally, with respect to Compositions I and J, tensile lap strength was measured after humidity aging at 120° F. and 100% relative humidity for 500 hours and after humidity aging at 120° F. and 100% relative humidity for 1000 hours. The specimens were pulled at 0.5 inches/minute using an Instron testing machine in accordance with American Standard Test Measurement (ASTM) D1002. The results of the aforementioned measurements are shown in Table 2.

TABLE 2

Tensile Lap Strength of Prior Art Composition A and Inventive Compositions C, I, and J Applied to Flaky Galvanized Steel

| Conditions | Prior Art Composition A Tensile Lap Strength (psi) | Composition C Tensile Lap Strength (psi) | Composition I Tensile Lap Strength (psi) | Composition J Tensile Lap Strength (psi) |
|---|---|---|---|---|
| 0 hour @ 85° C./85% RH[1] | 2406 | 2721 | 2532 | 2790 |

TABLE 2-continued

Tensile Lap Strength of Prior Art Composition A and Inventive
Compositions C, I, and J Applied to Flaky Galvanized Steel

| Conditions | Prior Art Composition A Tensile Lap Strength (psi) | Composition C Tensile Lap Strength (psi) | Composition I Tensile Lap Strength (psi) | Composition J Tensile Lap Strength (psi) |
|---|---|---|---|---|
| (i.e., room temperature) | | | | |
| 250 hours @ 85° C./85% RH | 617 | 877 | 1356 | 1018 |
| 500 hours @ 85° C./85% RH | 0 | 136 | 1082 | 408 |
| 750 hours @ 85° C./85% RH | 0 | 0 | 1183 | 111 |
| 1000 hours @ 85° C./85% RH | 0 | 0 | 1002 | 0 |
| 500 hours @ 120° F./100% RH | — | — | 2409 | 2496 |
| 1000 hours @ 120° F./100% RH | — | — | 2087 | 2773 |

[1]Relative Humidity

As is apparent from Table 2, comparative Composition A exhibited initial tensile strength at room temperature but dramatically lost tensile strength when subjected to conditions of heat and humidity. Specifically, Composition A lost approximately 74% of its tensile strength after humidity aging at 250 hours and exhibited no tensile strength after 500 hours.

As is further apparent from Table 2, Compositions C, I, and J all exhibited greater tensile strength than Composition A at room temperature (i.e., after humidity aging at 85% relative humidity and 85° C. for 0 hours), with Composition C exhibiting a tensile strength of 2721 psi, Composition I exhibiting a tensile strength of 2532 psi, and Composition J exhibiting a tensile strength of 2790 psi. Moreover, Compositions C, I, and J all exhibited greater strength than Composition A after humidity aging at 85% relative humidity and 85° C. for 250 hours and after humidity aging at 85% relative humidity and 85° C. for 500 hours.

Importantly, Compositions I and J also exhibited significant tensile strength after humidity aging at 85% relative humidity and 85° C. for 750 hours, and Composition I exhibited significant tensile strength after humidity aging at 85% relative humidity and 85° C. for 1000 hours. Additionally, Compositions I and J each exhibited significant tensile strength after humidity aging at 120° F. and 100% relative humidity for 500 hours and significant tensile strength after humidity aging at 120° F. and 100% relative humidity for 1000 hours.

Example 2

This example demonstrates the superior ability of the present inventive compositions to bond to smooth galvanized surfaces.

Inventive Compositions B, D, E, F, and G were prepared in accordance with Table 1. As delineated in Table 1, Compositions B, D, E, F, and G all contained a phosphate ester component.

Lap shear specimens were prepared for Compositions B, D, E, F, and G using smooth, hot-dipped galvanized steel substrates. The specimens had ½ inch by 1 inch overlap and "zero" inch gap. Tensile lap strength was measured again under a variety of conditions: at room temperature (i.e., after humidity aging at 85° C. and 85% relative humidity for 0 hours); after humidity aging at 85° C. and 85% relative humidity for 250 hours; after humidity aging at 85° C. and 85% relative humidity for 750 hours; and after humidity aging at 85° C. and 85% relative humidity for 1000 hours. Additionally, tensile lap strength was measured after humidity aging at 120° F. and 100% relative humidity for 500 hours and after humidity aging at 120° F. and 100% relative humidity for 1000 hours. The specimens were pulled at 0.5 inches/minute in accordance with American Standard Test Measurement (ASTM) D1002. The results of the aforementioned measurements are shown in Table 3.

TABLE 3

Tensile Lap Strength of Inventive Compositions B, D, E, F, and G
Applied to Smooth Galvanized Steel at "Zero" Gap

| | Composition B | Composition D | Composition E | Composition F | Composition G |
|---|---|---|---|---|---|
| 0 hours @ 85° C./85% RH[1] (i.e., room temperature) | 2528 | 2226 | 2586 | 2017 | 2882 |
| 250 hours @ 85° C./85% RH | 2942 | 2528 | 2793 | 2484 | 3242 |
| 500 hours @ 85° C./85% RH | 2099 | 2466 | 2724 | 2220 | 3032 |
| 750 hours @ 85° C./85% RH | 2470 | 2650 | 2614 | 1702 | 2578 |

TABLE 3-continued

Tensile Lap Strength of Inventive Compositions B, D, E, F, and G
Applied to Smooth Galvanized Steel at "Zero" Gap

|  | Composition B | Composition D | Composition E | Composition F | Composition G |
|---|---|---|---|---|---|
| 1000 hours @ 85° C./85% RH | 1414 | 2369 | 2161 | 2229 | 2021 |
| 500 hours @ 120° F./100% RH | 2404 | 2435 | 2258 | 2095 | 2414 |
| 1000 hours @ 120° F./100% RH | 2430 | 2613 | 2334 | 2399 | 2159 |

[1]Relative humidity

As is apparent from Table 3, all of the tested compositions exhibited a tensile strength of at least 2000 psi at room temperature, with Composition G exhibiting a tensile strength of 2882 psi. Moreover, all of the tested compositions exhibited significant tensile strength when subjected to conditions of heat and humidity. Specifically, all of the tested compositions exhibited a tensile strength of at least 2400 psi after humidity aging at 85° C. and 85% relative humidity for 250 hours, with Composition G exhibiting a tensile strength of 3242 psi. Furthermore, all of the tested compositions exhibited a tensile strength of at least 2000 psi after humidity aging at 85° C. and 85% relative humidity for 500 hours, with Composition G exhibiting a tensile strength of 3032 psi. Even after humidity aging at 85° C. and 85% relative humidity for 1000 hours, all of the tested compositions exhibited tensile strength, with four of the five tested compositions (i.e., Compositions D–G) exhibiting a tensile strength of at least 2000 psi. Moreover, all of the compositions exhibited significant tensile strength after humidity aging at 120° F. and 100% relative humidity for 1000 hours, with Composition D exhibiting a tensile strength of at least 2613 psi.

The examples set forth above serve to illustrate the present invention, but in no way are intended to limit the spirit and scope thereof, which is defined by the following claims.

What is claimed is:

1. A process for inhibiting corrosion on a galvanized surface comprising the steps of:
   1) applying to a galvanized substrate surface a curable composition for bonding galvanized surfaces, and
   2) subjecting the composition-applied substrate surface to conditions sufficient to allow the composition to cure, wherein the curable composition comprises:
   (a) a first part comprising:
      (i) at least one curable (meth)acrylate component;
      (ii) a free-radical initiator component;
      (iii) a phosphate ester component in an amount sufficient to achieve a tensile strength on a galvanized surface of at least about 1000 psi when measured after humidity aging at 85% relative humidity and 85° C. for 250 hours; and
      (iv) methacrylic acid in an amount that is at least about 2% by weight of the total composition; and
   (b) a second part comprising one or more of an accelerator component, a carrier component, and a free radical initiator component, wherein at least one of the first part or the second part further comprises a corrosion inhibitor.

2. A process for inhibiting corrosion on a galvanized surface comprising the steps of:
   1) applying to a galvanized substrate surface a curable composition for bonding galvanized surfaces, and
   2) subjecting the composition-applied substrate surface to conditions sufficient to allow the composition to cure, wherein the curable composition comprises:
   (a) a first part comprising:
      (i) at least one curable (meth)acrylate component;
      (ii) a free-radical initiator component;
      (iii) a phosphate ester component; and
      (iv) an organic acid component in an amount sufficient to achieve a tensile strength on a galvanized surface of at least about 2500 psi at room temperature; and
   (b) a second part comprising one or more of an accelerator component, a carrier component, and a free radical initiator component, wherein the organic acid component is methacrylic acid in an amount that is at least about 2% by weight of the composition.

3. A process for inhibiting corrosion on a galvanized surface comprising the steps of:
   1) applying to a galvanized substrate surface a curable composition for bonding galvanized surfaces, and
   2) subjecting the composition-applied substrate surface to conditions sufficient to allow the composition to cure, wherein the curable composition comprises:
   (a) a first part comprising:
      (i) at least one curable (meth)acrylate component;
      (ii) a free-radical initiator component;
      (iii) a phosphate ester component; and
      (iv) an organic acid component in an amount sufficient to achieve a tensile strength on a galvanized surface of at least about 800 psi when measured after humidity aging at 85% relative humidity and 85° C. for 250 hours; and
   a second part comprising one or more of an accelerator component, a carrier component, and a free radical initiator component, wherein the organic acid component is methacrylic acid in an amount that is at least about 2% by weight of the composition.

* * * * *